United States Patent Office 3,553,087
Patented Jan. 5, 1971

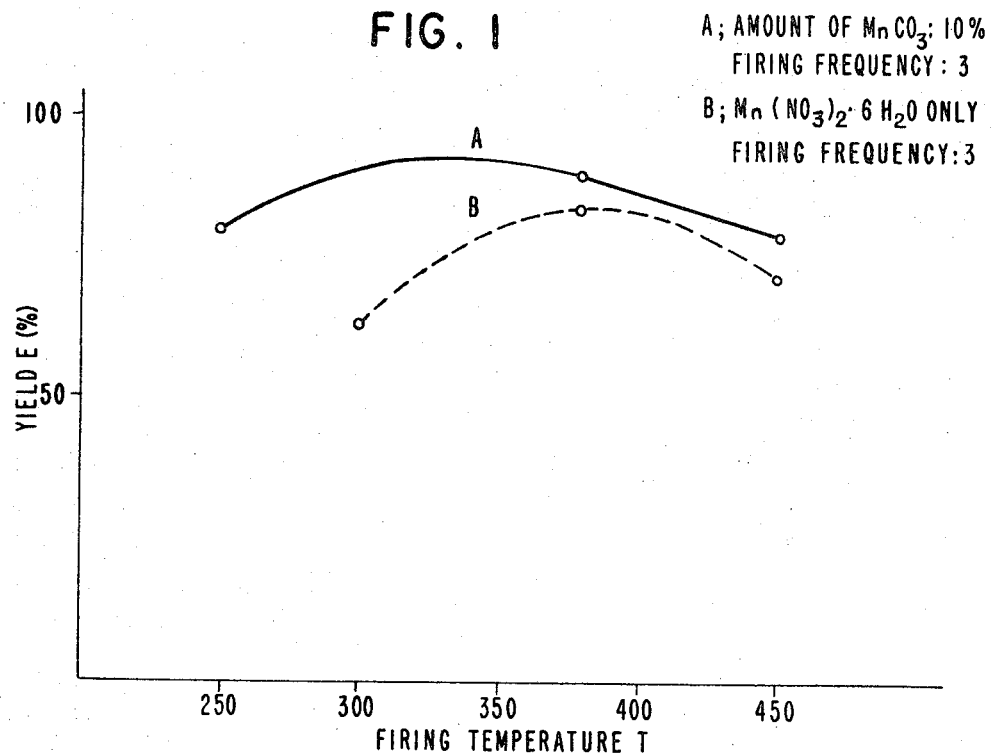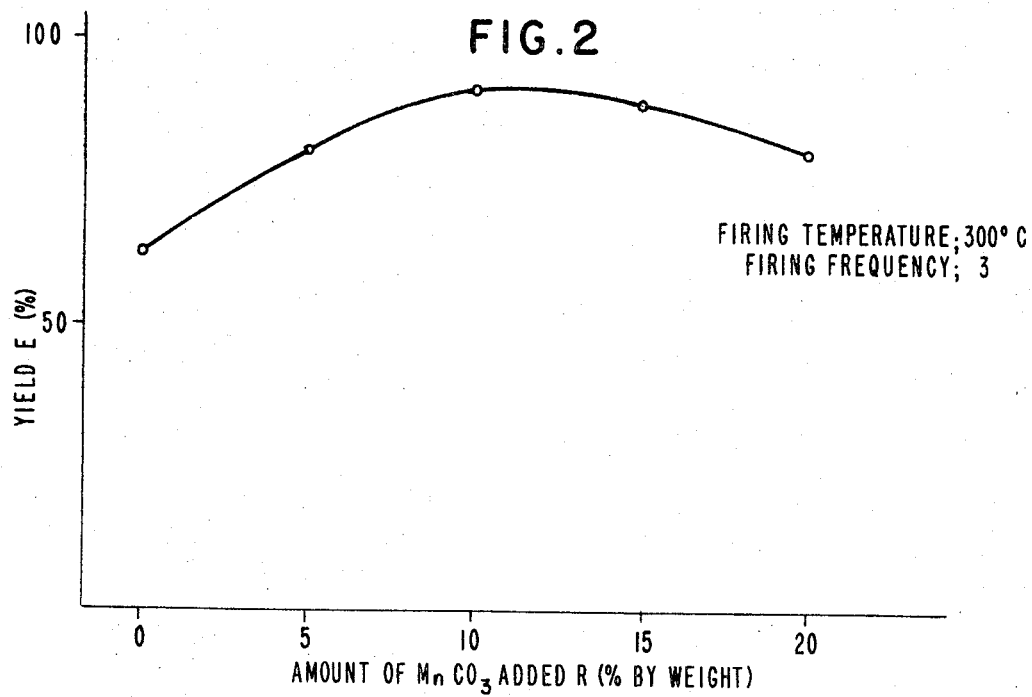

3,553,087
METHOD OF MANUFACTURING SOLID ELECTROLYTIC CAPACITORS
Akio Muramatsu, Suzaka-shi, Japan, assignor to Fujitsu Limited, Kawasaki, Japan, a corporation of Japan
Filed Dec. 5, 1967, Ser. No. 689,150
Claims priority, application Japan, Dec. 6, 1966, 41/79,978
Int. Cl. C23f 17/00; C23b 5/52; H01g 9/00
U.S. Cl. 204—38    3 Claims

ABSTRACT OF THE DISCLOSURE

Described is a method of manufacturing solid electrolytic capacitors comprising the steps of etching and forming a film-forming metal such as Al, Ta, Nb, Zr, Hf or Ti. Forming a semiconductor layer of manganese dioxide by pyrolysis of solution of manganese nitrate in water and forming the opposite electrode. In the formation of the semiconductor layer 5 to 20% of manganese carbonate powder is added to a solution of manganese nitrate in water which mixture is then pyrolized.

---

The present invention relates to a method of manufacturing solid electrolytic capacitors.

Solid electrolytic capacitors have been prepared by etching and forming a dielectric oxide layer by anodically oxidizing the surface of a film-forming metal such as Al, Ta, Nb, Zr, Hf and Ti; forming a semiconductor manganese dioxide layer on said oxide layer; and forming a colloidal graphite layer or a silver paint layer thereon. In this method, it is necessary to rotate the anode element during pyrolysis in order that the manganese dioxide layer, i.e. semiconductor layer be uniformly thick, since the viscosity of the aqueous solution of manganese nitrate is low.

In order to overcome this defect, it has been proposed to add a fine powder of silicon or alumina as a thickening agent for raising the viscosity to the aqueous solution of manganese nitrate. It thus becomes possible to make uniform the thickness of the semiconductor layer. This method, however, has the disadvantage that the loss of the solid electrolytic capacitance increases as the added agent is per se an insulator.

In either case, the manganese nitrate is pyrolyzed. The known temperature of decomposition of manganese nitrate is 129° C. In order to form a manganese dioxide layer which is excellent as the semiconductor layer of a capacitor, however, a heat treatment of at least 300° C. is required. This gives rise to another disadvantage in the conventional method since cracks are formed in the oxide film of the anode element. The leakage current flowing after the attachment of manganese dioxide becomes far greater than the leakage current flowing when the oxide film is formed within the formation liquid.

My invention obviates the deficiencies of the conventional manufacturing methods as described above. Thus, it is an object of my invention to provide a method of manufacturing solid electrolytic capacitors with a small leakage current by lowering the temperature for formation of the manganese dioxide layer.

Another object of my invention is to provide a method of manufacturing solid electrolytic capacitors with a dense and uniform manganese dioxide layer while requiring fewer repetitions of the pyrolysis treatment.

According to my invention, the semiconductor layer of manganese dioxide is obtained by dipping a wound body, formed by winding an etched and formed film-forming metal wire or plate or foil, together with an opposite electrode into an aqueous solution of manganese nitrate, to which a specific amount of manganese carbonate has been added and pyrolyzing the adhering solution. The pyrolysis can be at one time or step by step. The invention is characterized by the use of an aqueous solution of manganese nitrate to which a specific amount of manganese carbonate has been added at the time of formation of the manganese dioxide layer. It thus becomes possible to form a dense manganese dioxide layer at a temperature lower than the temperature of pyrolysis of a single solution of manganese nitrate, thereby greatly reducing cracks and deterioration of the oxide film during the pyrolysis step.

By the addition of a suitable amount of manganese carbonate, the viscosity of the solution of this invention is also increased. Furthermore, since manganese carbonate itself forms manganese dioxide upon being pyrolyzed, a large amount of manganese dioxide can be attached uniformly by a single pyrolysis and therefore the number of times of the pyrolysis treatment can be reduced. The important concept of this invention is the use of an aqueous solution of manganese nitrate to which a specific amount of manganese carbonate has been added in the formation of a manganese dioxide layer on a film-forming metal wire or plate or wound body as described above.

In the manufacturing method of this invention, 5–20% manganese carbonate is added to the aqueous solution of manganese nitrate in water used in the formation of manganese dioxide layer. If the percentage of manganese carbonate is lower than 5%, it is effectively impossible to obtain the above-mentioned effect whereas if the percentage is higher than 20%, the manganese dioxide to be attached does not become dense, but rather becomes porous and the dielectric loss tangent rises. Therefore, more practical embodiments of this invention can be obtained when manganese carbonate is 5–20% by weight of the manganese nitrate. If the amount of manganese carbonate to be added is relatively large within the above range, pyrolysis becomes possible maintaining the denseness of the manganese dioxide layer at a lower temperature than when said amount is relatively small.

In the accompanying drawing which illustrates my invention:

FIG. 1 shows the relationship between firing temperature and yield in the conventional method and in the method of my invention; and FIG. 2 shows the relationship between the amount of manganese carbonate and yield in an embodiment of my invention.

My reason for limiting the amount of manganese carbonate to 5–20% by weight will become evident from an example below. Since this invention is essentially characterized by a novel method of adding manganese carbonate to an aqueous solution of manganese nitrate in the formation of manganese dioxide layer by pyrolysis, the invention should not be limited by the specific examples.

As described above, this invention uses an aqueous solution of manganese nitrate to which 5–20% manganese carbonate has been added in the formation of a manganese dioxide semiconductor layer in the conventional method of manufacturing solid electrolytic capacitors. The manganese dioxide layer is formed by dipping a wound body prepared by winding an etched and formed film-forming metal wire or plate or an etched and formed film-forming metal foil together with an opposite electrode foil in an equeous solution of manganese nitrate to which 5–20% manganese carbonate has been added and pyrolyzing this. This etching and forming of the film-forming metal is performed according to the conventional well known method. Thus, when the film-forming metal is aluminum, the metal can be etched electrolytically, using for example, hydrochloric acid, nitric acid, sulfuric acid and mixtures thereof. Boric acid, ammonium borate, borax and mixtures thereof can be used as the electrolyte.

In one example, an aluminum plate of 14.5 mm. x 9.5 mm. was stamped out of an aluminum plate, which was at least 99.99% pure, having a thickness of 1 mm. The aluminum plate was made roughened by machining. An annealed copper wire was then welded on a projected portion provided at one end of said aluminum plate and this was used as the anode element. The anode element was etched electrolytically for 3.5 minutes at 0.36 a./cm.², using an etching liquid, consisting of 16% hydrochloric acid, 5% aluminum chloride and 7 g./l. sulfuric acid at 70° C. The anode element was then formed for an hour, at the normal temperature, at a formation voltage of 30 v., five times as high as the rated voltage 6 v., at a current density of 108 ma. per element, using a formation liquid containing 4.5% borax and 3.8% citric acid, with an electric conductivity of 12,000–18,000 $\mu\Omega$/cm. and a pH of 4 to 4.5.

This anode element was then dipped for 2–3 seconds in a 63% solution of manganese nitrate $$[Mn(NO_3)_2 \cdot 6H_2O]$$

in water to which 10% manganese carbonate ($MnCO_3$) had been added and kept at 70° C. The element was then taken out of the solution, the liquid dripping from the element was absorbed and the element was fired for five minutes at 250 to 450° C., whereby a manganese dioxide coating formed on the element. The period for the pyrolysis was set at five minutes chiefly so that the time required for the manufacture of the capacitor would not be too long from the viewpoint of practical operation for satisfactory performance of the pyrolysis. The pyrolysis temperature can be set at arbitrary values according to circumstances.

To compare the characteristic of the solid electrolytic capacitor obtained by the method of this invention with the characteristic of the solid electrolytic capacitor manufactured by the use of a solution of manganese nitrate in water 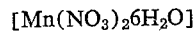 according to the conventional method, an anode element processed as described above was dipped for 2–3 seconds in a solution of manganese nitrate only in water. The liquid dripping from the element was then absorbed and manganese dioxide was deposited on the element by firing for 5 minutes at 300–450° C. Here, the firing time was set at five minutes for the same reason as above.

After the first depositing of manganese nitrate, both the anode element according to the method of this invention and the anode element on which manganese dioxide has been coated according to the conventional method, were formed for 30 minutes as in the case of the first formation under a formation voltage of 24 v., four times as high as the rated voltage. A second manganese dioxide layer was formed on the anode element according to the method of this invention and the element according to the conventional method, by the same method as the first depositing of manganese dioxide. A third depositing of manganese dioxide was performed in the similar manner. Lastly, the third layer was formed on the two elements for 10 minutes with a voltage of 12 v. in the similar manner as the first formation. In the above process, the second and third formations are carried out with the purpose to repair cracks and damages produced in the formed film in the first and second depositing of manganese dioxide.

In this embodiment of the invention, to form the opposite electrode, the element on which the last formation had been performed was coated with graphite. This was achieved by dipping the element into an aqueous solution of colloidal graphite, A graphite layer was formed by drying the element for an hour and a half in a drying furnace at 100° C. Thereafter, zinc powder was sprayed by the gas method on about half of the area of the element to provide the metallic contact. The cathode lead wire was led out by soldering it on the portion to which a cathode lead wire had been attached by metallic contact.

The relationship between the yields and the temperatures of depositing of manganese dioxide layers in capacitors obtained in both the method of this invention and the conventional method is shown in FIG. 1. In this figure, the abscissa T indicates firing temperature in ° C. and ordinate E indicates yield in percent. Curve A shows the yield according to the method of this invention while curve B shows the yielding according to the conventional method. The yield is the ratio of the number of capacitors of good quality of which leakage current is under 0.06 $\mu$a., dielectric loss tangent is under 12% and capacity deviation is +40 and −20% as against the total number (5220) of samples manufactured by forming manganese dioxide at the respective firing temperature in accordance with each of the above methods.

It is evident from FIG. 1 that, if solid electrolytic capacitors are manufactured using an aqueous solution of manganese nitrate to which 10% manganese carbonate has been added according to this invention, the same yield can be obtained at lower temperatures, e.g. at 260° C., which is 120° lower than the normal firing temperature of 380° C. In other words, high yield can be maintained even at lower coating temperatures. Thus, the manganese dioxide layer is uniform and dense while the leakage current simultaneously can be reduced. It is also evident from this figure that when the firing temperature is between 270° C. and 410° C., the yield is better than when using the conventional method.

If the firing is at a temperature lower than 250° C. in my method, the dielectric loss tangent of the capacitor obtained is liable to become larger than the designated value, whereas at a temperature higher than 450° C., the formed film is injured as in the case of the conventional method and the manganese dioxide content decreases with possible formation of lower oxides such as $Mn_2O_3$ and $Mn_3O_4$ and increase both of leakage current and dielectric loss tangent. It is therefore desirable to use a firing temperature between 250° C. and 450° C. The firing temperature should be selected at a relatively lower tempertaure within this temperature range, to prevent the oxide film from being injured during the firing of the manganese dioxide.

The yields obtainable when reducing the number of times of firing of manganese dioxide as compared to three firings in both the embodiment of this invention and that of the conventional method are shown in the following Table I.

TABLE I

| Solution of manganese nitrate in water | Number of times of coating | |
|---|---|---|
| | 2, percent | 3, percent |
| Yield according to: | | |
| Conventional solution (380° C.) | 52 | 84 |
| Solution of the invention (300° C.) | 81 | 91 |

In the above table, the values in parentheses indicate firing temperatures. As evident from Table I, using a firing temperature of 300° C. with only two firings produces the same yield and characteristics as the conventional method wherein the firing temperature is 380° C. using three firings.

The relationship between yield and the manganese carbonate content of the aqueous solution of manganese nitrate used wherein the temperature of the first to third firing of manganese dioxide is kept at 300° C. is shown in FIG. 2. In this diagram, the abscissa indicates the amount of manganese carbonate added R in percent by weight and the ordinate indicates yield E in percent. The term "yield" has the same meaning in FIG. 2 and in FIG. 1. As evident from FIG. 2, capacitors can be manufactured at the highest yield when the manganese carbonate content is 10%. As is seen in FIG. 2, when the manganese carbonate content is less than 5%, one cannot lower the firing temperature while maintaining high yield. When the MnCO₃ content is above 20%, the manganese dioxide layer becomes porous and the dielectric loss tangent is liable to become larger than the designated value. Thus, the manganese carbonate content is particularly limited to 5 to 20%, so that the yield may be above 80%.

In another example of my invention, manganese nitrtae including 10% manganese carbonate was used and capacitors were manufactured by using the same method as the aforementioned embodiment. The relation between the firing temperatures of manganese dioxide and the number of firing times and various characteristics of the capacitors obtained in this example is shown in the following Table II as well as various characteristics of capacitors fired at a firing temperature of 380° C. in accordance with the conventional method described above.

TABLE II

| Solution of manganese nitrate in water | Firing temperature (° C.) | No. of times of coating | Leakage current ($\mu$a.) | Electrostatic capacity ($\mu$f.) | Dielectric loss tangent (percent) |
|---|---|---|---|---|---|
| Conventional solution | 380 | 3 | 0.72 | 11.15 | 3.2 |
| Solution of this invention | 380 | 3 | 0.62 | 11.26 | 3.1 |
| | 300 | 3 | 0.32 | 11.30 | 3.3 |
| | 300 | 2 | 0.35 | 11.33 | 3.2 |
| | 250 | 3 | 0.10 | 11.72 | 3.7 |

In Table II, the third firing of manganese dioxide was omitted in the case of the sample fired only twice. Electrostatic capacity and dielectric loss angle tangent were measured in 120 c./s. As evident from Table II, the firing temperature can be lowered while maintaining the other electrical characteristics. Namely, the leakage current can be greatly reduced. The apparent effect of lowering the firing temperature can be seen in the fact that the leakage current is lower from 0.72 to 0.10 $\mu$a. and the advantage of this invention is clearly shown by this fact.

All percentages used in this specification and the claims are by weight unless otherwise specified. While only Al has been shown, other film forming metals such as Ta, Nb, Zr, Hf and Ti are equally applicable.

I claim:
1. In the method of manufacturing solid electrolytic capacitors which comprises etching a film-forming metal, forming an oxide layer on the surface of the metal dipping the oxidized metal into an aqueous solution of manganese nitrate containing 5 to 20% manganese carbonate pyrolizing the adhering solution to form a semiconductor layer of manganese dioxide on said oxide layer.
2. The method of claim 1, wherein the pyrolysis temperature is from 250° C. to 450° C.
3. The method of claim 2, wherein the manganese dioxide layer is deposited in a plurality of coatings.

References Cited

UNITED STATES PATENTS 3,345,543  10/1967  Sato _____ 317—230

JOHN H. MACK, Primary Examiner

W. VAN SISE, Assistant Examiner

U.S. Cl. X.R.

117—200; 204—37; 317—230